United States Patent [19]
Werle et al.

[11] 3,928,305
[45] Dec. 23, 1975

[54] UREA DERIVATIVES OF ACYL DERIVATIVES OF KTI

[75] Inventors: Eugen Werle; Hans Fritz; Harald Schult, all of Munich, Germany

[73] Assignee: Farbenfabriken Bayer Aktiengesellschaft, Leverkusen, Germany

[22] Filed: Nov. 23, 1970

[21] Appl. No.: 92,314

[30] Foreign Application Priority Data
Dec. 19, 1969 Germany............................ 1963734

[52] U.S. Cl............................... 260/112.5; 424/177
[51] Int. Cl.².................. C07C 103/52; A61K 37/26
[58] Field of Search................... 260/112.5; 424/177

[56] References Cited
OTHER PUBLICATIONS
Fritz et al., Hoppe–Seyler's Z. Physiol. Chem., 350, 1531–1540, (1969), cited in Chem. Abst. 72:63000g.

Primary Examiner—Lewis Gotts
Assistant Examiner—Reginald J. Suyat
Attorney, Agent, or Firm—Depaoli & O'Brien

[57] ABSTRACT

Acylated derivatives of kallikrein-trypsin-inhibitor (KTI) are reacted with cyanates such as potassium cyanate or O-alkylisoureas, such as O-methylisourea, to produce an urea derivative of the acylated KTI in which the $\epsilon$-amino group of the lysine residue in position 15 of the KTI is replaced by an urea or guanidine group. The area derivatives of the acylated KTI are found to be as effective therapeutically and for the same proposes as KTI itself, but contrary to KTI are not very extensively accumulated in the kidneys and thus provide a long-lasting high level in the blood. Since they are excreted with the urine they are particularly useful in the treatment of diseases of the urogenital tract.

6 Claims, No Drawings

UREA DERIVATIVES OF ACYL DERIVATIVES OF KTI

BACKGROUND OF THE INVENTION

Field of the Invention

The present invention relates to therapeutic compositions and more particularly to derivatives of the kallikrein-trypsin-inhibitor having improved therapeutic characteristics over the previously known products.

The kallikrein-trypsin-inhibitor, subsequently designated KTI (trademark Trasylol of Messrs. Bayer AG, Leverkusen) has for many years represented a very particularly valuable medicine, above all against inflammatory processes and against consumption coagulopathies.

KTI is very extensively accumulated in the kidneys, and as a result the level of KTI in the blood drops rather rapidly. For this reason endeavours have been made to find KTI derivatives which are less extensively accumulated in the kidneys and which therefore give a longer-lasting high level in the blood.

SUMMARY OF THE INVENTION

It has now been found that urea derivatives of acyl derivatives of KTI meet this requirement to a high degree.

By acyl derivatives of KTI there are here understood those which are described and claimed in U.S. patent application Ser. No. 92,313 filed Nov. 23, 1970 entitled "Acyl Derivatives of KTI".

The acyl derivatives are those acyl derivatives of KTI in which positions 26, 41 and 46, and the amino group of the N-terminal arginine in position 1 of the KTI, are partially or completely acylated, and in particular by carboxylic acid residues and/or by sulphonic acid residues.

By urea derivatives there are here understood those in which the ε-amino group of the lysine residue in position 15 of the KTI is replaced by a urea group or a guanidine group.

The new compounds according to the invention are equally well tolerated as KTI. A significant advantage of the new compounds is the fact that they are not very extensively accumulated in the kidneys and therefore give a long-lasting high level in the blood. The new compounds are furthermore excreted with the urine and therefore prove particularly valuable in illnesses of the urogenital tract. In other respects they possess approximately the same activity as KTI itself. This activity is measured in inhibitor units, IU. One IU corresponds to the inhibition of the activity of 1 mg of trypsin, measured with N-a-benzoyl-DL-arginine-p-nitroanilide as the substrate, under the following standard conditions:

3 ml total volume
Temperature 25°C.
1 cm light path
1 mg of substrate in 1 ml of distilled water
+ 10 mU of trypsin in 0.001 normal HCl
+ $x$ ml of inhibitor solution
ad 3.0 ml 0.2 molar triethanolamine buffer pH 7.8
+ 0.02 mol of calcium chloride.

A further advantage of the new compounds according to the invention is the fact that the complex formation with the enzymes, for example with trypsin, occurs more rapidly than with KTI itself and that therefore trypsin inhibition is reached more rapidly.

The new compounds according to the invention are prepared by reacting the above mentioned acyl derivatives of KTI with cyanates such as the alkali metal or ammonium cyanates or with O-alkylisoureas, such as the O-lower alkylisoureas preferably with O-methylisourea, in a manner which is in itself known. In the first case, homocitrulline is obtained instead of lysine, and in the second case homoarginine is obtained instead of lysine, in the reactive centre of the acyl derivatives of KTI, for example tetra (maleoyl)-[15-homoarginine]-KTI or tetra (maleoyl)-[15-homocitrulline]-KTI.

The new compounds according to the invention can be employed in medicine for the same indications as those for which KTI itself has been successfully used for many years in diseases of body organs attacked by proteases. The administration forms and doses to be used also largely correspond to those known from the case of KTI as by intravenous or intramuscular injection of an aqueous solution.

EXAMPLE 1

A solution of 19 mg of tetra (maleoyl)-KTI in 4 ml of 1.0 M O-methyl-isourea and 0.02 M EDTA, having a pH-value of 9.5, is left to stand for 60 hours at room temperature, thereafter treated with 4.0 ml of 0.5 M $NH_4Cl$ solution of pH 7.6, and subsequently incubated for a further 14 hours at room temperature. Thereafter the reaction solution is applied to a Sephadex-G-50 column which has been equilibrated with 0.02 M ammonium acetate buffer, pH 6, and eluted with the same buffer. The fraction containing the tetra (maleoyl)-[15-homoarginine]-KTI is concentrated in a vacuum rotary evaporator and desalinated by means of a Bio-Gel-P-2 column. The salt-free solution of the modified KTI is lyophilised.

Yield: The salt-free solution after lyophilisation yields 13 mg of tetra (maleoyl)-[15-homoarginine]-KTI as a loose colourless powder, corresponding to a total yield of 68%. The specific activity is 3–3.6 IU/mg.

EXAMPLE 2

10 mg of tetra (maleoyl)-KTI in 0.75 ml of the reaction solution prepared from 1.5 ml of N-ethyl morpholine in 5 ml of distilled water plus glacial acetic acid up to pH 8.0 plus 500 mg of potassium cyanate, are incubated for 56 hours at 20°C. The reaction mixture is subsequently applied to a Sephadex-G-50 column which has been equilibrated with 0.01 M tris-buffer, pH 7.0. The fractions of the first absorption peak of higher protein content occurring in the eluate are collected and concentrated to 1/10 of the starting volume in a vacuum rotary evaporator. The concentration of the tetra-(maleoyl)-[15-homocitrulline]-KTI contained in the solution is determined by measuring the absorption at 275 nm, relative to a solution of known concentration of tetra(maleoyl)-KTI in 0.1 M tris-buffer, pH 7.0.

Yield: The concentration of tetra(maleoyl)-[15-homocitrulline]-KTI is 0.67 mg/ml, representing a total of 5.33 mg, that is to say 53% relative to the amount of tetra(maleoyl)-KTI employed. The specific activity is 1.5 – 2.0 IU/mg.

What is claimed is:

1. Urea derivatives of acylated kallikrein-trypsin-inhibitor wherein the positions 26, 41, 46 and the amino group of the N-terminal arginine in position 1 are partially or completely acylated, and wherein the ε-amino group of the 15-lysine residue is replaced by a radical selected from the group consisting of urea and guanidine radicals.

2. Tetra(maleoyl)-[15-homoarginine]-kallikrein-trypsin-inhibitor.

3. Tetra(maleyol)-[15-homocitrulline]-kallikrein-trypsin-inhibitor.

4. The process for preparing urea derivatives of acylated kallikrein-trypsin-inhibitor as defined in claim 1, which comprises reacting the acylated kallikrein-trypsin-inhibitor with a compound selected from the group consisting of alkali metal cyanate, ammonium cyanate and o-lower alkyl-iso-urea.

5. The process as defined in claim 4, wherein the acylated kallikrein-trypsin-inhibitor is reacted with O-methylisourea.

6. The process as defined in claim 4, wherein the acylated kallikrein-trypsin-inhibitor is reacted with potassium cyanate.

* * * * *